F. BIBERSTEIN.
AEROPLANE
APPLICATION FILED JAN. 8, 1912.

1,021,178.

Patented Mar. 26, 1912.

Inventor
Frank Biberstein
Witnesses
By Erwin & Wheeler
Attorneys

UNITED STATES PATENT OFFICE.

FRANK BIBERSTEIN, OF MILWAUKEE, WISCONSIN.

AEROPLANE.

1,021,178. Specification of Letters Patent. Patented Mar. 26, 1912.

Application filed January 8, 1912. Serial No. 669,972.

*To all whom it may concern:*

Be it known that I, FRANK BIBERSTEIN, a citizen of the United States, residing at Milwaukee, county of Milwaukee, and State of Wisconsin, have invented new and useful Improvements in Aeroplanes, of which the following is a specification.

My invention relates to improvements in aeroplanes for flying machines, and the like. The object of my improvement is to increase the speed of the forward movement and the lifting capacity of an aeroplane whereby a plane of a given area under a given air pressure, whether such pressure be produced by a rapid forward movement of the same when propelled by a motor, or by natural currents of air when gliding, or when the planes are otherwise exposed to currents of air, will be greatly increased, and whereby planes of much smaller area may be used for supporting a given weight.

My invention is further explained by reference to the accompanying drawings, in which—

Figure 1:
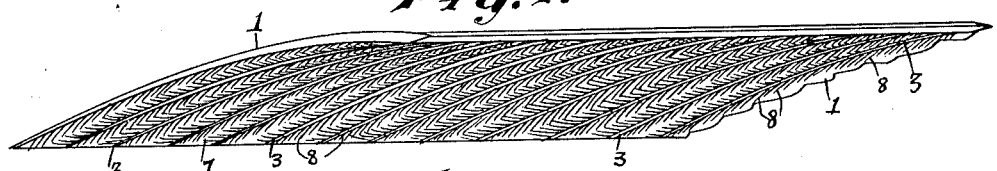
Figure 2:
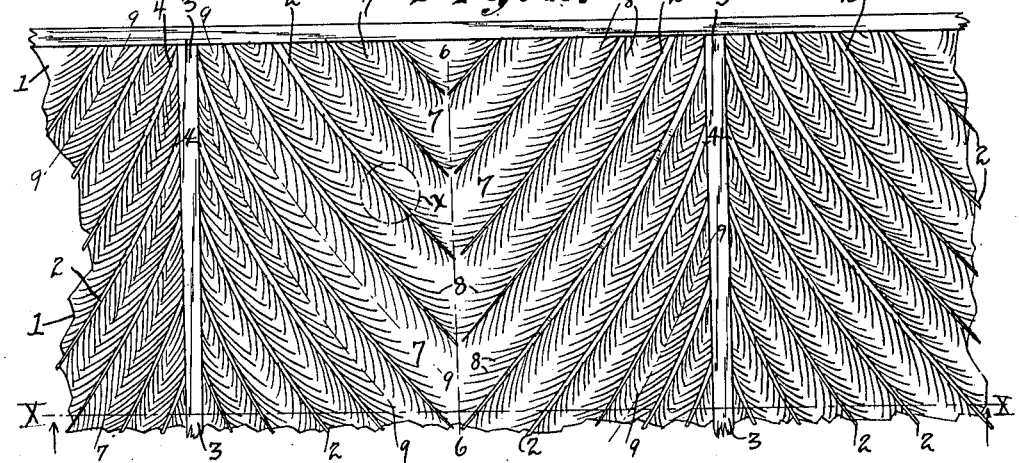
Figure 3:
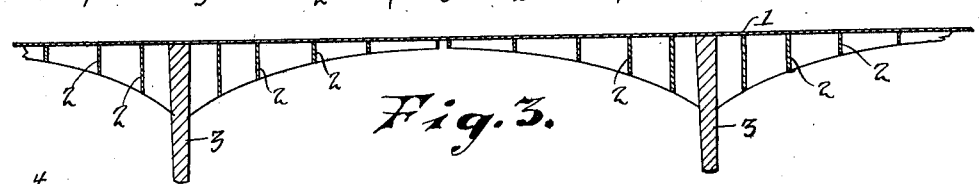
Figures 4, 5:
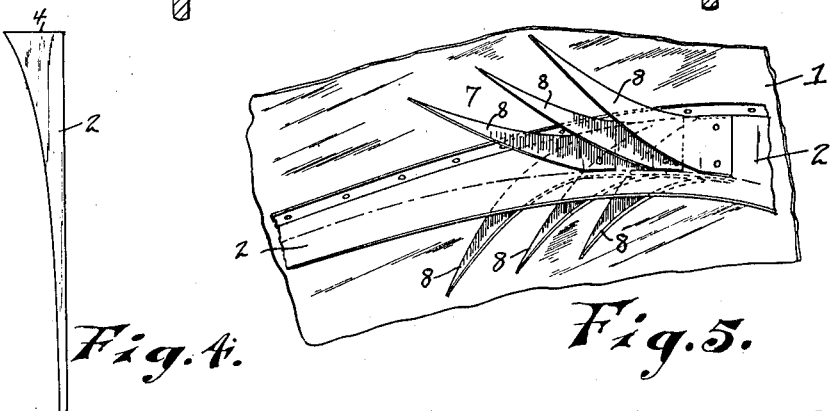

Figure 1 is a perspective view of an aeroplane from its lower side. Fig. 2 is an enlarged detail view of a small portion of the plane shown in Fig. 1. Fig. 3 is a transverse section, drawn on line x—x of Fig. 2. Fig. 4 is a side view of one of the numerous deflecting blades shown in Figs. 1 and 2; and Fig. 5 is a detail view of an enlarged portion of the plane included within the dotted line x of Fig. 2.

Like parts are identified by the same reference numerals throughout the several views.

1 represents the body of the plane, which is preferably made smooth upon its upper side and is slightly curved, as indicated in Fig. 1, while the lower side of the plane 1 is provided with a plurality of series of curved blades 2. The several series of blades 2 are sub-divided by a plurality of division bars 3, which extend in a direct line from the front to the rear of the plane, while the several blades 2 are arranged at an angle to the division bars 3 and are secured to the body 1 of the plane with glue, or in any other convenient manner. The wider upper ends 4 of said blades 2 are connected with the division bars 3, while the narrower ends of said bars 2 converge toward their lower or rear ends, meeting centrally between the division bars 3 on the line 6. The several spaces 7, 7, between the blades 2, are practically covered by two series of blades 8, 8. The blades of each series 8, 8, converge downwardly and meet together on the line 9. The object of the blades 2 and the blades 8 is to multiply the surface area against which the moving air is caused to act, whereby the lifting power of a plane of a given area under a given air pressure, will, as stated, be greatly multiplied, and whereby the area of the planes of a flying machine of a given lifting capacity may be greatly reduced.

While the planes shown and described are adapted more especially to be used with flying machines, it is obvious that the same may, if desired, be used for increasing the motive power of wind-wheels, such power being increased in proportion to the surface area exposed to the action of a moving current of air.

Having thus described my invention, what I claim as new, and desire to secure by Letters Patent, is—

1. In a device of the described class, the combination with a plane having a smooth upper surface, of a plurality of parallel bars extending from the front to the rear of its lower surface, two series of blades located between each pair of said parallel bars, the blades of the respective series converging rearwardly and terminating on a central line between said parallel bars, and means for securing said blades and bars to the lower surface of said plane.

2. In a device of the described class, the combination with a concavo-convex aeroplane having a smooth upper surface, of a plurality of parallel bars extending from the front to the rear of its lower concave surface, two series of blades located between each pair of said parallel bars, the blades of the respective series converging rearwardly and terminating on a central line between said parallel bars, and means for securing said blades and bars to the lower surface of said plane.

3. In a device of the described class, the combination with a plane having a smooth upper surface, of a plurality of parallel bars extending from the front to the rear of its lower surface, two series of blades located between each pair of said parallel bars, the blades of the respective series converging rearwardly and terminating on a central line between said parallel bars, the front ends of said blades being of a width corresponding with the width of said parallel bars and converging upwardly toward their rear or opposite ends, two series of rearwardly converging smaller blades interposed between each pair of said first named blades, and means for securing all of said blades and bars to the lower surface of said aeroplane, all substantially as and for the purpose specified.

In testimony whereof I affix my signature in the presence of two witnesses.

FRANK BIBERSTEIN.

Witnesses:
 JAS. B. ERWIN,
 IRMA D. BREMER.